United States Patent [19]

Bryson

[11] 4,148,763

[45] Apr. 10, 1979

[54] RECLAIM OIL FOR DIGESTER PROCESS FOR RUBBER RECLAIMING

[75] Inventor: Jay G. Bryson, Tallmadge, Ohio

[73] Assignee: The Goodyear Tire & Rubber Company, Akron, Ohio

[21] Appl. No.: 926,595

[22] Filed: Jul. 20, 1978

[51] Int. Cl.$^2$ .................. B29H 19/00; C08J 11/04
[52] U.S. Cl. ...................... 260/2.3; 252/364; 260/710; 260/717; 260/719; 260/720
[58] Field of Search ............ 260/2.3, 717, 719, 720

[56] References Cited

U.S. PATENT DOCUMENTS

| | | | |
|---|---|---|---|
| T949,007 | 8/1976 | Crane et al. | 260/2.3 |
| T949,008 | 8/1976 | Crane et al. | 260/2.3 |
| T949,009 | 8/1976 | Fieldhouse et al. | 260/2.3 |
| 2,338,427 | 1/1944 | Gumlich et al. | 260/720 |
| 2,449,879 | 9/1948 | Corkery | 260/23 X |
| 2,806,821 | 9/1957 | Hill | 260/2.3 |
| 2,871,205 | 1/1959 | Mankowich et al. | 260/2.3 |
| 2,908,676 | 10/1959 | Van Valkenburgh | 260/97.5 |
| 3,008,906 | 11/1961 | Nicolaisen | 260/2.3 |
| 3,043,786 | 7/1962 | White | 260/2.3 |
| 3,116,258 | 12/1963 | Beaven | 252/364 |
| 3,272,761 | 9/1966 | Glenn et al. | 260/2.3 |
| 3,318,838 | 5/1967 | Beverly | 260/33.6 |
| 3,657,160 | 4/1972 | Crepeau | 260/2.3 |
| 3,674,433 | 7/1972 | Wyatt | 423/450 |
| 3,700,615 | 10/1972 | Scott | 260/2.3 |
| 3,701,741 | 10/1972 | Meyer, Jr. et al. | 260/2.3 |
| 3,873,474 | 3/1975 | Ficker | 260/2.3 |
| 3,896,059 | 7/1975 | Wakefield et al. | 260/2.3 |

*Primary Examiner*—Thomas DeBenedictis
*Attorney, Agent, or Firm*—D. B. Little

[57] ABSTRACT

Natural and synthetic rubber can be reclaimed by the use of a reclaiming oil having a molecular weight between 200 and 1000 and comprised of a mixture of substituted benzene compounds, such as alkyl benzenes and alkylated indanes, which mixture has an initial boiling point greater than or equal to 240° C. These may be the only reclaiming oils charged to the digester, or they may be used to replace any volatile reclaiming oils used in the older processes. The resulting reclaimed rubber gives no greater contact or migratory stain then reclaimed rubber made with known non-staining oils, and much less oil is lost during the venting or blow-down of the digester.

9 Claims, No Drawings

RECLAIM OIL FOR DIGESTER PROCESS FOR RUBBER RECLAIMING

BACKGROUND OF THE INVENTION

This invention is related to an improvement in commercial rubber reclaiming processes. Specifically, it is related to the devulcanizing or depolymerizing step called the digester process, more specifically to the improvements resulting from the use of a new reclaim oil.

The conventional rubber reclaiming process can be divided into three major parts, preparation, breakdown, and refining. The preparation steps are: sorting of the scrap rubber articles, cracking or grinding, sifting, magnetic separation, and in-process storage. Breakdown is also called devulcanization and depolymerization and is commonly accomplished by either the heater process, the digester process, the Reclaimator process, or the high pressure steam process. Refining comprises mixing the depolymerized rubber with reinforcing and processing agents and various refining (passing the rubber through mill rolls) and straining steps.

Typically in the digester process, ground scrap rubber is blended in definite proportions with water, reclaiming agents (oils and catalyst), then mixed in an autoclave under conditions of elevated temperature (e.g. 180° C.) and pressure for a period lasting from 1–10 hours.

The terms "reclaiming agent" and reclaiming oil are often used interchangeably, most being composite by-products not well defined in composition. Reclaiming catalysts, on the other hand, are chemical compounds of which only small amounts are needed during the depolymerization. The phenol alkyl sulfides and disulfides are examples of effective reclaiming catalysts used in the rubber reclaiming industry today.

Reclaiming oils have more than one function. They are used to make the vulcanized scrap rubber thermoplastic again by plasticizing it, and to swell the scrap in order to make the fabric reinforcement easily accessible to the digesting solution. The swelling function of the reclaim oils aids in the tearing of the rubber on the refiner mills. In fact, the effectiveness of an oil in reclaiming is said to depend primarily on its effectiveness in swelling the scrap rubber (see Rostler, K.S. & White, R.M., "Swelling of Rubber," *Rubber Age, Feb.* 1946, page 585-590). Good penetration into the rubber is also desirable.

Because of these several functions, more than one (most often two) oils are often used in combination. Usually, the oil which is used to swell the rubber is volatile and is lost from the rubber when pressure is reduced in the blow-down of the digester, and when the reclaim rubber stock is worked in sheet mills at elevated temperatures. Volatile for purposes of this application means having an initial boiling point less than 240° C., and blow-down is the release of pressure from the digester at the end of the digestion process.

The less volatile oils are retained in the stock to plasticize it and render it sufficiently soft and pliable during and after working. Unfortunately the escape of the more volatile oils into the atmosphere creates air pollution. Some tumor promoting or carcinogen activity has been attributed to alkyl naphthalenes (see Schemltz et al., *Anal. Chem.* 48, 645, 1976). The aromatic oils separated from petroleum for use in reclaiming processes usually contain alkyl naphthalenes.

One answer to the problem of pollution by these lighter reclaim oils is condensation. A condenser may be placed in the vent line above the digester for the recovery of these oils. This can be combined with the steam distillation of the mixture in the digester after the batch is finished for the recovery of even more of the oil (see Le Beau, D.S., "Science and Technology of Reclaimed Rubber," *Rubber Chemistry and Technology*, Volume 40, page 217-237, 1967, and Belgian Patent No. 621,764).

The staining properties of reclaim rubber are affected by the reclaim process. Minimum staining is important because of the use of reclaim rubber in such products as white sidewall tires. Therefore, it is desirable to use a minimum staining reclaim oil in the process. Such an oil should have few (or non-mobile) color bodies.

The state of the art in rubber reclaiming oils is represented in the following patents: U.S. Pat. No. 3,116,258 (mixtures of alkylbenzenes and alkylnaphthalenes); U.S. Pat. No. 2,806,821 ($AlCl_3$-polymerized ethylene as a reclaim oil); U.S. Pat. No. 2,449,879 (blend of volatile solvent naphtha and coke oven light oil compounds). Defensive publication No. T949,007 teaches the use of high levels of volatile armoatics in reclaim oil for manufacturing solubilized reclaimed rubber. The following literature articles are also of interest: Slavova, S. et al, *God. Vissh.- Khim. - Technol. Inst. Burgas*, Bulgaria 1972 (pub. 1973), 9(9), 315-26, CA82:126317v (mixture of aromatic and naphthene hydrocarbons); and Andreeva, V. and Svetaeva, E., Kokskhim, (1), 40 (1970) (styrene-indene resin used).

Most of the reclaiming oils known to the art contain a substantial portion distilling below 240° C. During the venting of the digester, processing, and storage, a significant portion of the volatile oil escapes, decreasing the weight of plasticizer in the rubber, causing air pollution (or requiring recovery), and releasing an unpleasant odor. A reclaim oil which performs the several functions described above but which does not have these disadvantages would be highly desirable. Air pollution or the cost of recovery equipment could be reduced, and plasticization of the reclaimed rubber would be improved.

SUMMARY OF THE INVENTION

The above advantages are realized through an improvement in the digester process which comprises using a reclaim oil which is a mixture of substituted aromatic compounds with structures selected from the following group:

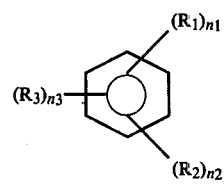

A.

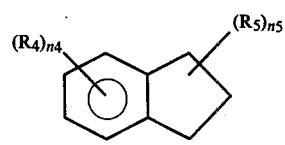

B.

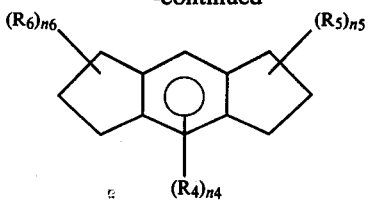

wherein $R_1$, $R_2$, $R_3$, and $R_4$ are radicals selected from the group consisting of alkyl radicals (2-20C) and aralkyl radicals (7-20C); $R_5$ and $R_6$ are radicals selected from the group consisting of H, alkyl (1-20C), and aralkyl (7-20C); $n_1 + n_2 + n_3 = 1-4$; $n_4$, $n_5$, and $n_6 = 1-2$; wherein the initial boiling point of the reclaim oil is 240° C. or greater, and wherein the molecular weight range of substantially all of the components of the mixture is 200-1000.

The above described process has the advantage of using one oil which accomplishes all the functions described in the background section. Existing digester processes may also be imnproved by simply replacing all or a major part of the volatile components of the reclaim oil used with the oil described above.

The oil is different from those of the prior art in beiing essentially free of aliphatics, naphthenes, alkenylbenzenes, alkylnaphthalenes, coal tar or resin products, and materials boiling below 240° C.

The reclaim oil of this improvement may be produced by the alkylation of armoatics (such as benzene, toluene, ethylbenzene, xylene, or cumene) with olefins having from 2 to 20 carbon atoms. Typical alkylation processes are found in the following U.S. Pat. Nos. 2,730,557; 2,881,227; 2,945,901.

The types of rubber to which this improvement is applicable are: natural rubber, styrene butadiene rubber (SBR), polybutadiene, polyisoprene, and blends of any of these. Butyl rubber or EPDM (ethylene propylene diene terpolymer) could also be used if not mixed with the rubbers already mentioned.

Generally, from 5 to 25 parts by weight reclaim oil is used per 100 parts by weight scrap rubber in the digester (abbreviated phr).

Because the reclaim oil of this improvement tends to remain in the rubber after it is discharged from the digester, air pollution and the need for vapor recovery are reduced. In addition, the characteristics of the oil give both the vent gases and the reclaim stock a less objectionable odor. Other benefits of this process improvement are that the oil may be used at lower levels than known non-aromatic reclaiming oils of a similar boiling range, and the reclaim rubber produced gives no greater contact or migratory stain than reclaimed rubber made with known miniumum staining oils. The reclaim rubber obtained is suitable for minimum staining applications, such as tire components in contact with white sidewall stock.

DESCRIPTION OF THE PREFERRED EMBODIMENTS

Preferably the oil used in the process improvement of this invention is a dark brown oil having a Saybolt viscosity of 85-99 SSU at 20° C. (30-36 SSU at 100° C.), a specific gravity of 0.88-0.9 at 20° C., and a refractive index greater than 1.5. As analyzed by gel permeation chromatography (ASTM test D3016 and 3536) and mass spectroscopy, preferably over 97 percent of its components have molecular weights in the range of 200-400 (which fraction is colorless). Also, the 50 percent boiling point (boiling point after 50 percent of the oil has been distilled off) is preferably about 248° C.

Gas chromatography of the particular reclaim oil utilized and developing this improvement showed over 30 components. Most of the oil boiled between tri- and tetraisopropylbenzene (240°-260° C.). Tetraisopropylbenzene was the largest single component (5-12 wt. percent). Small amounts of isopropylated 2,2-diphenylpropanes, isopropylated hexylbenzenes, and isopropylated ethylbenzenes are present. No iospropenyl benzene derivatives have been detected in the oil.

The particular oil used in the research and development of this invention was a distillation bottoms stream from a process producing diisopropylbenzene by silica-alumina catalyzed alkylation of cumene with propylene, and subsequent transalkylation with benzene. This process is described in an article in *Chemical Engineering*, June 9, 1975, pages 50-51, and corresponds to the stream labeled heavies, in the alkylation section flow sheet. As used, the oil had the following physical properties; dark brown in color (Gardner color number about 18); viscosity of 92 SSU at 20° C. and 33 SSU at 100° C.; specific gravity of 0.898 at 20° C.; refractive index of 1.5155; and a flash point (Cleveland Open Cup) of 115° to 121° C.

The reclaim catalyst used in the experiments which led to this invention was a mixture of aryl disulfides dissolved (at about 70 wt. percent concentration) in a petroleum oil having a flash point greater than 148° C. The active sulfur content of the reclaim catalyst was about 16.8 to 19.6%, and the specific gravity of the catalyst composition was 1.055 to 1.073 at 15.5° C. The generic formula for these aryl disulfides is

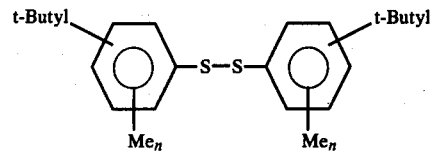

wherein $n = 0-2$ (average about 1). The reclaim catalyst was obtained as Pitt-Consol 500 from the Pitt-Consol Chemical Company of Newark, New Jersey.

A more detailed explanation of the process of this invention is furnished in the description of representative experiments utilizing the process. The following examples are intended to be purely exemplary of the invention. Unless otherwise stated, parts are parts by weight and percentages are by weight.

EXAMPLE i

Ground-(30 mesh) scrap tire rubber (200 grams per batch), containing 30 percent natural rubber, 23 percent polybutadiene, and 47 percent SBR (freed of wire and fiber) was mixed with 24-32 grams of reclaim oil and 2 grams of reclaim catalyst. This mixture was rolled for one hour. The mixture was then added to a one quart rocking autoclave with 35 milliliters (ml) of water. The autoclave was heated up to 180° C. in 47 minutes and held for 2 hours at 180-190° C. and 1,378-1,723 kiloPascals (kPa). The rubber obtained at the end of the digestion process was refined (run through a refining mill with a roll spacing of 0.013 cm) to remove any hard particles, then it was sheeted out on a mill to 0.64 cm. Samples of the reclaimed rubber thus obtained were compounded, vulcanized, and tested as described below.

The recipe used in these compounds was patterned after one found in Ball, J., *Manual of Reclaimed Rubber*, page 56, Rubber Reclaimers Association, 1956.

The recipe and physical properties of the rubbers are shown in Table No. 1.

TABLE NO. 1

| Reclaim Batch | A | B |
|---|---|---|
| Grams reclaim oil | | |
| Per 200g scrap rubber in digester | 32 | 24 |
| Recipe: | | |
| Reclaimed Rubber | 200 | 200 |
| ZnO | 5 | 5 |
| Stearic acid | 2 | 2 |
| Sulfur | 3 | 3 |
| Mercaptobenzothiazole | 0.5 | 0.5 |
| Diphenylguanidine | 0.25 | 0.25 |
| Properties: | | |
| Original- | | |
| *Optimal Cure Time at 150° C. (min.) | 18 | 18 |
| Mooney Viscosity (large rotor) | 70 | 86 |
| Tensile strength at break in meganetons/m² (MN/m²) | 4.4 | 4.4 |
| 100% Modulus (tensile strength at 100% elongation) MN/m² | 1.5 | 1.8 |
| % elongation at break | 200 | 185 |
| Shore A Hardness | 57 | 60 |
| **Aged- | | |
| Tensile strength at break, MN/m² | 6.4 | 6.4 |
| 100% Modulus, MN/m² | 4.0 | 4.0 |
| % Elongation | 140 | 140 |
| ***Contact and Migratory Stain | | |
| Acrylic-Coated Tile | none | none |
| Nitrocellulose-Coated Tile | Moderate | Moderate |

*For 0.20 cm sheets, actual cure time 20 minutes
**100° C. in air, 22 hours, 0.20 cm sheets
***ASTM D-925, 24 hrs. at 56° C. under RS/HUV lamp for migratory stain, and 24 hrs. at 70° C. in forced air oven for contact stain.

The compounded rubbers made from reclaim batches A and B were softer (lower shore A hardness) than similar compounds made with oils actually used in production. This softness should reduce energy consumption in straining and milling the rubber. The reclaimed rubber produced by the improved process of this invention also had less ordor than the reclaimed rubber produced with the production oil. The retention of physical properties by the compounds of this example was close to that of the reclaimed rubber produced with the production oil. Also, the staining properties were equivalent to reclaim produced with the production oil.

EXAMPLE II

Further reclaim rubber samples were made by the digester process in a similar manner to that described in Example I with the following exceptions; The initial mixture of scrap rubber, reclaim oil, and reclaim catalyst was rolled for 2 hours; heat-up of the autoclave took one hour; the autoclave was held at 190°-200° C.; the digestion time was 1½ hours; and the digester was vented through a dry ice-acetone trap. The material in the trap was allowed to melt and was separated for analysis. The above-described procedure was followed with the reclaim oil of the present improvement and also with a rubber reclaiming oil composition made according to U.S. Pat. No. 3,116,258.

The reclaim oil composition according to U.S. Pat. No. 3,116,258 had the following components: 8.5% 1-isopropyl-3-ethylbenzene, 17.0% p-diisopropylbenzene, 6.4% naphthalene, 21.3% 2-methyl-naphthalene, 21.3% 1-methylnaphthalene, 21.3% ethylnaphthalene, and 4.2% acenaphthene. In both cases, 24 grams of oil was used per digester batch containing 200 grams of scrap rubber.

Analysis of the trapped vent vapors revealed that 1.8 grams of organic material was released during blow-down of the improved digester process (less than 8 percent of the reclaim oil); while 3.5 grams organic material was released during the blow-down of the prior art digester process (greater than 14 percent of the reclaiming oil). This represents a significant reduction in air pollution and/or vapor recovery requirement.

The rubber obtained at the end of the digestion process was refined, compounded, vulcanized and tested in the same manner as described in Example I. The physical properties of the compounds are shown in Table No. 2.

TABLE NO. 2

| Compound Reclaim Oil | C Alkylbenzene alkylnaphthalene blend | D Alkylation heavies |
|---|---|---|
| Tensile strength at break (MN/m²) | 4.7 | 4.1 |
| 100% Modulus (MN/m²) | 1.3 | 1.3 |
| % Elongation at Break | 210 | 200 |
| Shore A Hardness | 55 | 50 |

While certain representative embodiments and details have been shown for the purpose of illustrating the invention, it will be apparent to those skilled in the art that various changes and modifications may be made therein without departing from the spirit or scope of the invention.

What is claimed is:

1. An improvement in the digester process for reclaiming rubber, which process normally comprises breaking down a quantity of scrap rubber mixed in definite proportions with water, a reclaiming catalyst, and reclaiming oil under conditions of elevated temperature and pressure for a period lasting from 1 to 10 hours, wherein the improvement comprises using as the reclaim oil a mixture of substituted aromatic compounds with structures selected from the following group:

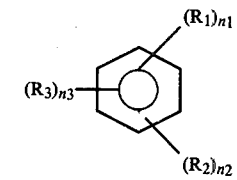

A.

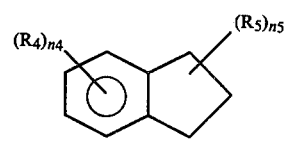

B.

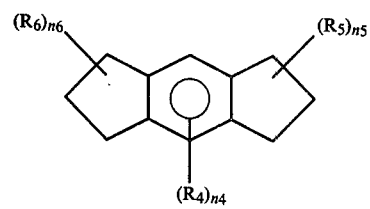

C.

wherein $R_1$, $R_2$, $R_3$, and $R_4$ are radicals selected from the group consisting of alkyl radicals (2-20C) and aralkyl radicals (7-20C); $R_5$ and $R_6$ are radicals selected from the group consisting of H, alkyl (1-20C), and aralkyl (7-20C); $n_1 + n_2 + n_3 = 1-4$; $n_4$, $n_5$, and $n_6 = 1-2$; wherein the initial boiling point of the reclaim oil is 240° C. or greater, and wherein the molecular weight range of substantially all of the components of the mixture is 200-1000.

2. The improved digester process as recited in claim 1, wherein the scrap rubber used is selected from the group consisting of natural rubber, styrene butadiene rubber, polybutadiene rubber, polyisoprene, blends of any of the preceding rubbers, butyl rubber, and EPDM rubber with the proviso that butyl rubber and EPDM rubber may not be used if mixed with the other rubbers listed.

3. The improved process as recited in claim 2, wherein the reclaim catalyst used is a mixture of aryl disulfides dissolved at about a 70 weight percent concentration in a petroleum oil having a flash point greater than 148° C., said reclaim catalyst having the following characteristics: an active sulfur content of about 16.8 to 19.6 percent, a specific gravity of 1.055 to 1.073 at 15.5° C., and the following generic formula:

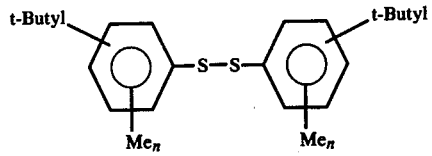

wherein n 0-2 (average about 1).

4. The process improvement as recited in claim 3, wherein the amount of reclaim oil used is from 5 to 25 parts by weight per 100 parts by weight of scrap rubber charged to the digester.

5. The process improvement as recited in claim 4, wherein the reclaim oil has the following characteristics: Saybolt viscosity of 85 to 99 SSU at 20° C., 30-36 SSU at 100° C.; specific gravity of 0.88-0.9 at 20° C.; refractive index greater than 1.5; and molecular weights for over 97 percent of its components within the range of 200 to 400.

6. The process improvement as recited in claim 5, wherein the reclaim oil is produced by the alkylation of aromatics selected from the group consisting of benzene, toluene, ethylbenzene, xylene, and cumene with an olefin having from 2 to 20 carbon atoms.

7. The process improvement as recited in claim 6, wherein the reclaim oil has a 50 percent boiling point of about 248° C.

8. The process improvement as recited in claim 6, wherein the mixture of substituted aromatic compounds which comprises the reclaim oil must contain compounds having molecular structures selected from structures B and C.

9. An improvement in the digester process for reclaiming rubber, which process normally comprises breaking down a quantity of scrap rubber mixed with definite proportions of water, reclaim catalyst, and a mixture of reclaim oils, some of which have initial boiling points less than 240° C. and are termed volatile, under conditions of elevated temperatures and pressure in an autoclave for a time ranging from 1 to 10 hours; wherein the improvement comprises replacing all or a major part of the volatile reclaim oil with a mixture of substituted aromatic compounds having the following molecular structures;

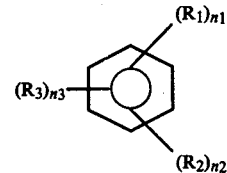

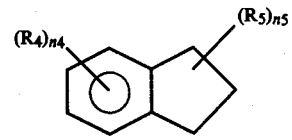

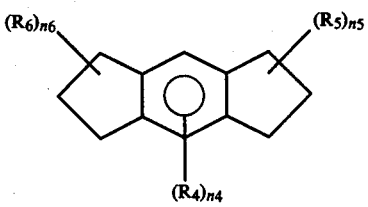

wherein $R_1$, $R_2$, $R_3$, and $R_4$ are radicals selected from the group consisting of alkyl radicals (2-20C) and aralkyl radicals (7-20C); $R_5$ and $R_6$ are radicals selected from the group consisting of H, alkyl (1-20C), and aralkyl (7-20C); $n_1 + n_2 + n_3 = 1-4$; $n_4$, $n_5$, and $n_6 = 1-2$; wherein the initial boiling point of the reclaim oil is 240° C. or greater, and wherein the molecular weight range of substantially all of the components of the mixture is 200-1000.

* * * * *